(12) United States Patent
Islam et al.

(10) Patent No.: US 10,247,899 B2
(45) Date of Patent: Apr. 2, 2019

(54) DEVICE FOR DISTRIBUTING HYBRID TRUNK CABLE

(71) Applicant: CommScope Technologies LLC, Hickory, NC (US)

(72) Inventors: Nahid Islam, Westmont, IL (US); Terry Scott Worden, Joliet, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/254,666

(22) Filed: Sep. 1, 2016

(65) Prior Publication Data

US 2018/0061528 A1 Mar. 1, 2018

Related U.S. Application Data

(60) Provisional application No. 62/214,501, filed on Sep. 4, 2015.

(51) Int. Cl.
*G02B 6/44* (2006.01)

(52) U.S. Cl.
CPC ......... *G02B 6/4472* (2013.01); *G02B 6/4416* (2013.01); *G02B 6/4494* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,138,657 | A * | 6/1964 | Wengen | ................ | H02G 15/18 174/5 R |
| 3,328,512 | A * | 6/1967 | Lembke | ................ | H01R 43/24 174/20 |
| 3,657,513 | A * | 4/1972 | Howard | ................ | H05B 3/06 174/90 |
| 3,770,871 | A * | 11/1973 | Goodman | ............. | H02G 15/24 174/11 R |

(Continued)

FOREIGN PATENT DOCUMENTS

CN 103109221 5/2013

OTHER PUBLICATIONS

Notification of Transmittal of the International Search Report and the Written Opinion of the International Searching Authority, International Application No. PCT/US2016/049406; dated Dec. 12, 2016; 11 Pages.

(Continued)

*Primary Examiner* — William H Mayo, III
*Assistant Examiner* — Krystal Robinson
(74) *Attorney, Agent, or Firm* — Myers Bigel, P.A.

(57) ABSTRACT

A transition assembly for a hybrid trunk cable includes: a hybrid trunk cable comprising a plurality of power conductors and a plurality of optical fibers surrounded by a jacket; a transition cup having a cavity, the hybrid trunk cable entering a first end of the transition cup; a plurality of power cords exiting a second end of the transition cup, each of the power cords electrically connected to a respective power conductor; a plurality of fiber optic cords exiting the second (Continued)

end of the transition cup, each of the fiber optic cords optically connected to a respective optical fiber; and a weather-resistant material residing in the cavity of the transition cup to protect the power cords and the fiber optic cords within the cavity.

10 Claims, 2 Drawing Sheets

(56) References Cited

U.S. PATENT DOCUMENTS

| | | | | |
|---|---|---|---|---|
| 3,771,112 | A * | 11/1973 | Thompson | H01R 4/32 174/138 F |
| 3,961,127 | A * | 6/1976 | Gear, Jr. | H02G 15/06 174/22 R |
| 3,992,569 | A * | 11/1976 | Hankins | H02G 15/003 156/49 |
| 4,332,975 | A * | 6/1982 | Dienes | H02G 15/013 174/76 |
| 4,963,698 | A * | 10/1990 | Chang | H01R 4/70 156/49 |
| 5,403,977 | A * | 4/1995 | Steptoe | H01R 4/70 156/49 |
| 6,160,222 | A * | 12/2000 | Claverie | H02G 15/10 174/93 |
| 8,367,931 | B2 * | 2/2013 | Emerson | H01R 4/183 174/84 C |
| 9,182,564 | B2 * | 11/2015 | Strasser | G02B 6/4471 |
| 2004/0126069 | A1 * | 7/2004 | Jong | G02B 6/3878 385/109 |
| 2005/0191903 | A1 * | 9/2005 | Goodwin | H01R 13/52 439/578 |
| 2006/0120672 | A1 * | 6/2006 | Cody | G02B 6/3807 385/86 |
| 2006/0121775 | A1 * | 6/2006 | Wobben | G02B 6/3817 439/473 |
| 2007/0047895 | A1 * | 3/2007 | Parikh | G02B 6/4442 385/135 |
| 2008/0138020 | A1 * | 6/2008 | Robinson | G02B 6/4477 385/106 |
| 2008/0181570 | A1 * | 7/2008 | Mullaney | G02B 6/4475 385/135 |
| 2010/0034507 | A1 * | 2/2010 | Sielaff | G02B 6/4471 385/139 |
| 2010/0326725 | A1 | 12/2010 | Emerson et al. | |
| 2012/0027361 | A1 * | 2/2012 | Brower | G02B 6/4471 385/89 |
| 2013/0146355 | A1 * | 6/2013 | Strasser | G02B 6/4471 174/72 A |
| 2015/0086166 | A1 | 3/2015 | Coate | |
| 2015/0219856 | A1 | 8/2015 | Wang | |

OTHER PUBLICATIONS

Office Action corresponding to Chinese Application No. 201680046076.5 dated Jan. 11, 2019.

* cited by examiner

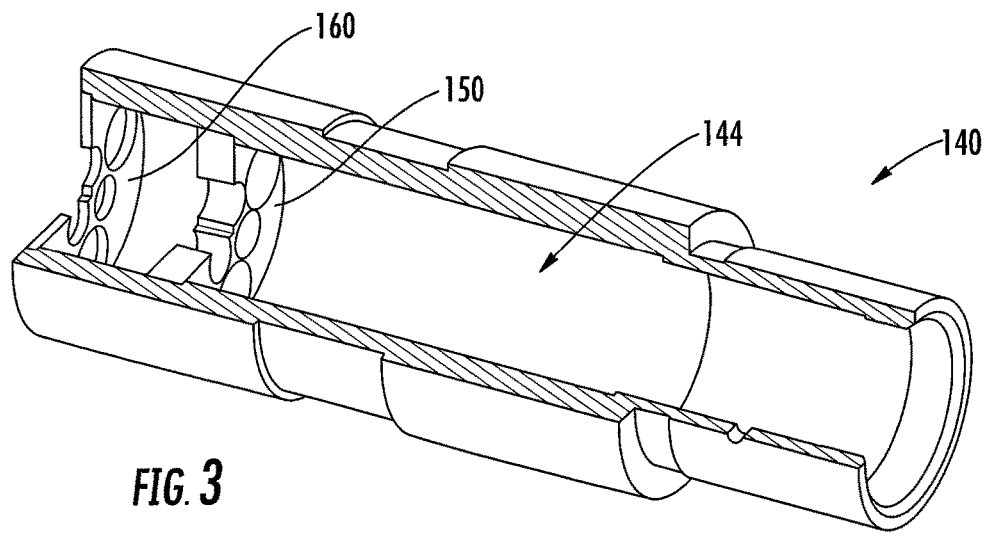
FIG. 3
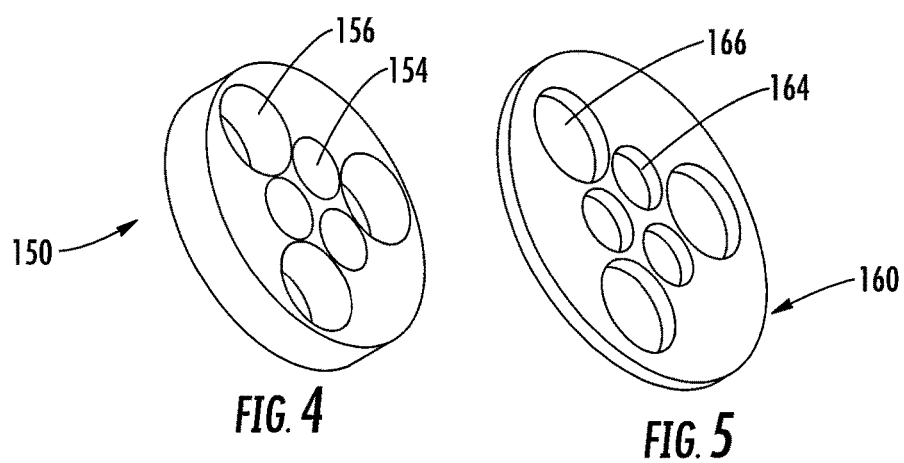
FIG. 4
FIG. 5
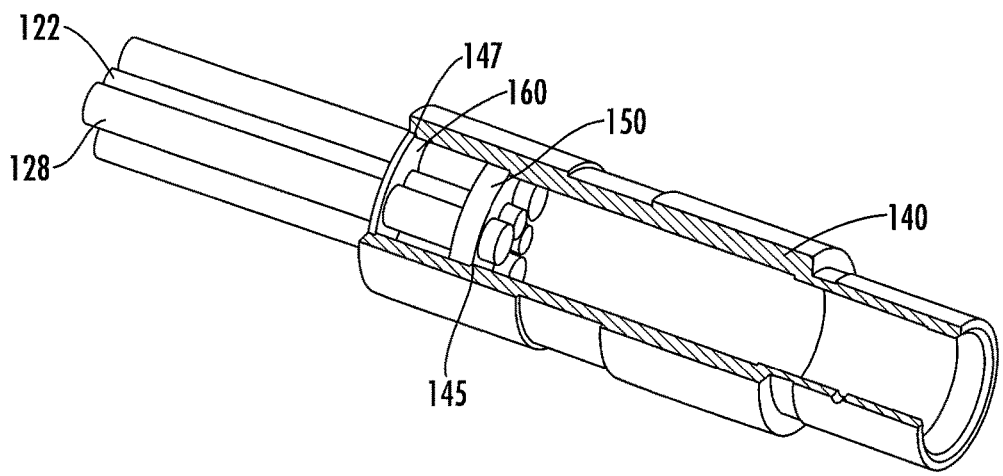
FIG. 6

US 10,247,899 B2

DEVICE FOR DISTRIBUTING HYBRID TRUNK CABLE

RELATED APPLICATION

The present application claims priority from and the benefit of U.S. Provisional Patent Application No. 62/214,501, filed Sep. 4, 2015, the disclosure of which is hereby incorporated herein in its entirety.

FIELD OF THE INVENTION

The present invention is directed generally to communications cable and equipment, and more particularly to distribution from hybrid cables.

BACKGROUND

Latest developments in technology for delivering power and data in wireless infrastructure use hybrid cables, wherein the term "hybrid cable" is intended to mean a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable. However, in order to use a single hybrid trunk cable, at some point the trunk cable must transition to jumper cables. Typically, these are distributed inside an enclosure that transitions the trunk conductor gauge to the jumper conductor gauge and connects the optical fibers in the trunk to the optical fibers in the jumper cables. Currently, transitions are achieved by making connections inside the enclosure, requiring it to be opened, cables to be fed/mated to the enclosure, and power and fiber connections to be made, all in the field (e.g., on the top of cell sites near a remote radio unit (RRU)). This practice can create many issues for installers, including time, safety, connection errors (such as loose power connections and/or poor fiber cleaning), and more opportunity for connector damage.

SUMMARY

As a first aspect, embodiments of the invention are directed to a transition assembly for a hybrid trunk cable, comprising: a hybrid trunk cable comprising a plurality of power conductors and a plurality of optical fibers surrounded by a jacket; a transition cup having a cavity, the hybrid trunk cable entering a first end of the transition cup; a plurality of power cords exiting a second end of the transition cup, each of the power cords electrically connected to a respective power conductor; a plurality of fiber optic cords exiting the second end of the transition cup, each of the fiber optic cords optically connected to a respective optical fiber; and a weather-resistant material residing in the cavity of the transition cup to protect the power cords and the fiber optic cords within the cavity.

As a second aspect, embodiments of the invention are directed to a transition assembly for a hybrid trunk cable, comprising: a hybrid trunk cable comprising a plurality of power conductors and a plurality of optical fibers surrounded by a jacket; a transition cup having a cavity, the hybrid trunk cable entering a first end of the transition cup; a plurality of power cords exiting a second end of the transition cup, each of the power cords electrically connected to a respective power conductor; a plurality of fiber optic cords exiting the second end of the transition cup, each of the fiber optic cords optically connected to a respective optical fiber; and a weather-resistant gasket residing in the cavity of the transition cup to protect the power cords and the fiber optic cords within the cavity.

As a third aspect, embodiments of the invention are directed to a transition assembly for a hybrid trunk cable, comprising: a hybrid trunk cable comprising a plurality of power conductors and a plurality of optical fibers surrounded by a jacket; a transition cup having a cavity, the hybrid trunk cable entering a first end of the transition cup; a plurality of power cords exiting a second end of the transition cup, each of the power cords spliced to a respective power conductor; a plurality of fiber optic cords exiting the second end of the transition cup, each of the fiber optic cords spliced to a respective optical fiber; and a weather-resistant material residing in the cavity of the transition cup to protect the power cords and the fiber optic cords within the cavity.

BRIEF DESCRIPTION OF THE FIGURES

FIG. 3 is a perspective cutaway view of a cup for a transition assembly according to embodiments of the invention.

FIG. 4 is a perspective view of a gasket of the transition assembly of FIG. 3.

FIG. 5 is a perspective view of a cap of the transition assembly of FIG. 3.

FIG. 6 is a perspective cutaway view of the transition assembly of FIG. 3 with fiber optic and power cables in place.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
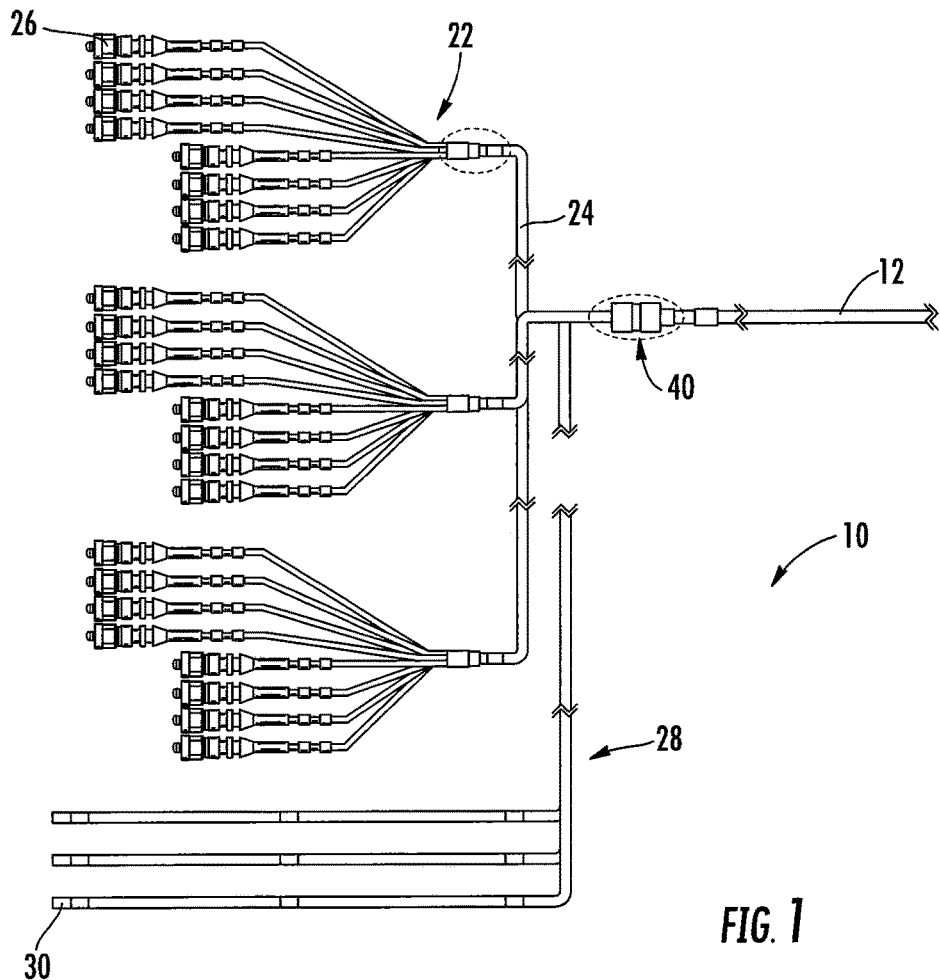
FIG. 1 is a schematic view of a transition assembly according to embodiments of the present invention.
Figure 2:
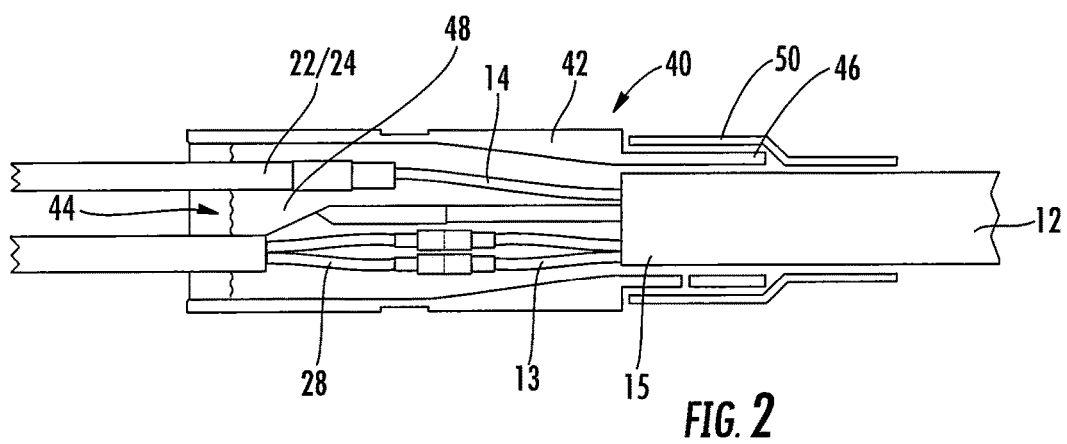
FIG. 2 is a section view of the cup of the transition assembly of FIG. 1.

Referring now to the drawings, a transition assembly, designated broadly at 10, is shown in FIGS. 1 and 2. The assembly 10 includes a hybrid trunk cable 12, a transition cup 40, power cords 28, and fiber optic cords 22.

Referring to FIG. 2, the transition cup 40 is generally cylindrical and may be formed of any suitable material, including metals and polymers. The transition cup 40 includes a main body 42 that defines a central cavity 44. At one end, the transition cup has a collar 46. The transition cup 40 is open at the opposite end.

The hybrid trunk cable 12, which has a plurality of power conductors 13 and a plurality of optical fibers 14 encased in a jacket 15, enters the transition cup 40 through the collar 46. A heat shrink sleeve 50 seals the interface between the jacket 15 and the collar 46. Within the cavity 44 of the transition cup 40, the power conductors 13 of the hybrid trunk cable 12 are spliced into the power cords 28 that exit the opposite, open end of the transition cup 40. Similarly, the optical fibers of the hybrid trunk cable 12 are spliced into the fiber optic cords 22 that exit the opposite end of the transition cup 40; these are protected with furcation tubes 24. At their opposite ends, the power cords 28 and the fiber optic cords 22 are terminated with appropriate connectors 30, 26.

Typically, the power cords 28 and fiber optic cords 22 extend between about 0.5 and 50 meters from the transition cup 40, with a length of 0.75 meters being more typical. Also, those of skill in this art will appreciate that different numbers of power conductors 13 and optical fibers 14 may be included, as may different numbers of power cords 28 and fiber optic cords 22

Once the power conductors 13 have been spliced to the power cords 28 and the optical fibers 14 have been spliced to the fiber optic cords 22, the cavity 44 of the transition cup 40 is filled (typically from the open end) with a weather-resistant material 48 such as an adhesive or potting compound. Typical weather-resistant materials include epoxy, polyurethane, and mixtures thereof, that can be added in liquid form to the transition cup 40 and allowed to harden/freeze in place. Weather-resistant properties may include water, chemical, and UV resistance.

The level of weather-resistant material 48 should be sufficient to engulf the splices of the power conductors/cords 13/28 and the optical fibers/fiber optic cords 14/22. This material 48 maintains the conductors 13, optical fibers 14, power cords 28 and fiber optic cords 22 in place while protecting the spliced areas from weather and other external factors.

Typically, the hybrid trunk cable 12 is routed from the base of an antenna tower or similar structure to a location adjacent a piece of equipment (such as an RRU) mounted on the structure. The power cords 28 are then connected to the equipment via the connectors 30 and the optical fibers 24 are connected to the equipment via the fiber optic connectors 26.

Those of skill in this art will appreciate that the transition device 10 may take other forms. The transition cup 40 may take a different shape. In some embodiments, the cavity 44 of the transition cup 40 may be partially filled with a filler (such as a liquid foam) to reduce the amount of epoxy required to protect the spliced areas. Transitions from (a) power conductor 13 to power cord 28 and/or (b) optical fiber 14 to fiber optic cord 22 may be achieved by means other than splicing. Other configurations will also be apparent to those of skill in this art.

Referring now to FIGS. 3-6, an alternative embodiment of a transition cup, designated broadly at 140, is shown therein. The transition cup 140 includes a gasket 150 (see FIG. 4) and a cap 160 (see FIG. 5) within the cavity 144. The gasket 150 includes holes 154 for receiving fiber optic cords 122 and holes 156 for receiving power cords 122 (see FIGS. 4 and 6). The cap 160 includes holes 164 for receiving fiber optic cords 122 and holes 166 for receiving power cords 122 (see FIGS. 5 and 6). The gasket 150 and cap 160 are maintained in place in shoulders 145, 147 on the inner surface of the main body 142 of the transition cup 140 (the gasket 150 may be an interference fit, and the cap 160 may be held in place via an adhesive). The gasket 150 should be positioned such that the transition areas (i.e., the splices) of the power and fiber optic interconnections are between the collar end of the transition cup 140 and the gasket 150.

The gasket 150 and cap 160 can help to maintain the power cords 128 and fiber optic cords 122 in an organized arrangement as they exit the transition cup 140, and can provide a weather-resistant seal. In some embodiments, the cavity 144 of the transition cup 140 may be filled with a weather-resistant material as described above. Also, in other embodiments, either the gasket 150 or the cap 160 may be omitted.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A transition assembly for a hybrid trunk cable, comprising:
   a hybrid trunk cable comprising a plurality of power conductors and a plurality of optical fibers surrounded by a jacket;
   a transition cup having a cavity, the hybrid trunk cable entering a first end of the transition cup, the transition cup having a second unsealed open end opposite the first end;
   a plurality of power cords exiting the second end of the transition cup, each of the power cords electrically connected to a respective power conductor at an electrical connection;
   a plurality of fiber optic cords exiting the second end of the transition cup, each of the fiber optic cords optically connected to a respective optical fiber at an optical connection; and
   a weather-resistant material residing in the cavity of the transition cup to protect the power cords and the fiber optic cords within the cavity, the weather-resistant material exposed through the second end of the transition cup, wherein the weather-resistant materials seals the electrical connections and the optical connections within the cavity.

2. The transition assembly defined in claim 1, wherein the weather-resistant material comprises epoxy and/or polyurethane.

3. The transition assembly defined in claim 1, wherein each power cord is spliced to its respective power conductor within the cavity.

4. The transition assembly defined in claim 3, wherein the splices of the power conductors and power cords are engulfed in the weather resistant-material.

5. The transition assembly defined in claim 1, wherein each optical fiber is spliced to its respective fiber optic cord within the cavity.

6. The transition assembly defined in claim 5, wherein the splices of the optical fibers and the fiber optic cords are engulfed in the weather-resistant material.

7. The transition assembly defined in claim 1, wherein each optical fiber passes through the transition cup to merge with a respective fiber optic cord.

8. A transition assembly for a hybrid trunk cable, comprising:
- a hybrid trunk cable comprising a plurality of power conductors and a plurality of optical fibers surrounded by a jacket;
- a transition cup having a cavity, the hybrid trunk cable entering a first end of the transition cup, the transition cup having a second unsealed open end opposite the first end;
- a plurality of power cords exiting the second end of the transition cup, each of the power cords spliced to a respective power conductor at an electrical connection;
- a plurality of fiber optic cords exiting the second end of the transition cup, each of the fiber optic cords spliced to a respective optical fiber at an optical connection; and
- a weather-resistant material residing in the cavity of the transition cup to protect the power cords and the fiber optic cords within the cavity, the weather-resistant material exposed through the second end of the transition cup, wherein the weather-resistant materials seals the electrical connections and the optical connections within the cavity.

9. The transition assembly defined in claim 8, wherein the weather-resistant material comprises epoxy and/or polyurethane.

10. The transition assembly defined in claim 8, wherein the splices of the power conductors and power cords are engulfed in the weather resistant-material, and wherein the splices of the optical fibers and the fiber optic cords are engulfed in the weather-resistant material.

* * * * *